United States Patent [19]

Kindl et al.

[11] Patent Number: 5,506,061
[45] Date of Patent: Apr. 9, 1996

[54] METHOD FOR THE PREPARATION OF METAL MATRIX COMPOSITE MATERIALS

[75] Inventors: Bruno Kindl, Peterboro, Canada; Yi-Lin Liu; Niels Hansen, both of Roskilde, Denmark

[73] Assignee: Forskningscenter Riso, Roskilde, Denmark

[21] Appl. No.: 809,527

[22] Filed: Jan. 21, 1992

[30] Foreign Application Priority Data

Jul. 6, 1989 [DK] Denmark .................. 3366/89

[51] Int. Cl.$^6$ .............. B22F 7/00; B05D 7/00; C04B 35/64
[52] U.S. Cl. ............ 428/549; 419/14; 419/19; 419/24; 419/35; 419/64; 419/66; 427/214; 427/215; 427/216; 427/220; 428/539.5; 428/554; 428/555; 428/556; 428/608; 264/58; 264/63; 264/241; 264/257; 264/258
[58] Field of Search ................ 427/214, 215, 427/216, 220; 419/13, 14, 19, 24, 35, 64, 66; 428/545, 539.5, 614, 554, 555, 556, 608, 570, 549; 264/58, 63, 241, 257, 258

[56] References Cited

U.S. PATENT DOCUMENTS

| | | | |
|---|---|---|---|
| 2,699,415 | 1/1955 | Nachtman | 75/203 |
| 4,060,412 | 11/1977 | Divecha | 75/203 |
| 4,632,794 | 12/1986 | Mori et al. . | |
| 4,634,608 | 1/1987 | Short et al. . | |
| 4,697,324 | 10/1987 | Grant et al. | 29/419 |
| 4,806,428 | 2/1989 | Cooper et al. | 428/403 |
| 4,935,295 | 6/1990 | Stevens | 428/288 |
| 5,108,964 | 4/1992 | Corbett et al. | 501/89 |
| 5,194,407 | 3/1993 | Waisala et al. | 501/32 |
| 5,202,059 | 3/1993 | Kennedy | 252/389.31 |
| 5,227,199 | 7/1993 | Hazelebeck et al. | 427/376.2 |
| 5,231,061 | 7/1993 | Devore | 501/95 |

FOREIGN PATENT DOCUMENTS

| | | |
|---|---|---|
| 0067584 | 5/1982 | European Pat. Off. . |
| 0108281 | 10/1983 | European Pat. Off. . |
| 0109241 | 11/1983 | European Pat. Off. . |
| 0280830 | 3/1987 | European Pat. Off. . |
| 0249927 | 6/1987 | European Pat. Off. . |
| 0313271 | 10/1988 | European Pat. Off. . |
| 61-149447 | 7/1986 | Japan . |
| 624844 | 1/1987 | Japan . |

OTHER PUBLICATIONS

Journal of Metals, Feb. 1988, A. Mortensen et al: "Solidification processing of metalmatrix composites", see p. 16 col. 1.
Ultrastructure, 1985, B. E. Yoldas: "Modification of Oxides by Polymerization Process", pp. 60–69.
Journal fo Non–Crystalline Solids 100, 1988, Peter F. James: "The Gel to Glass Transition: Chemical and Microstructural Evolution", pp. 93–114.
Chemica Scripta, 1988, J. Livage: "Sol–gel Processing of Metal Oxides", pp. 9–13.

(List continued on next page.)

*Primary Examiner*—Donald P. Walsh
*Assistant Examiner*—Anthony R. Chi
*Attorney, Agent, or Firm*—Merchant & Gould, Smith, Edell, Welter & Schmidt

[57] ABSTRACT

A method for preparing deagglomerated fibres and/or particles and for providing the fibres and/or particles with a substantially uniform protective coating, the fibres and/or particles being of a material selected from the group consisting of carbides oxides, nitrides, silicides, borides, metals and graphite, including SiC, TiC, ZrC, WC, NbC, AlN, TiN, BN, $Si_3N_4$, MgO, $Al_2O_3$, $SiO_2$, $ZrO_2$, $Fe_2O_3$, $Y_2O_3$, steel, tungsten, molybdenum and carbon, the method comprising (a) preparing an inorganic colloid sol, and (b) mixing the fibres and/or particles are deagglomerated and substantially homogeneously distributed. The fibres and/or particles, e.g. SiC whiskers provided with an aluminum oxide coating by treatment with an aluminum hydroxide-based sol, are used for the preparation of metal matrix composite materials, e.g. based on aluminum or an aluminum alloy.

35 Claims, 5 Drawing Sheets

OTHER PUBLICATIONS

Metals Handbood, Ninth Ed., vol. 2, Properties and Selection: NonFerrous Alloys and Pure Metals, American Society for Metals, Metals Park Ohio, 1979.

Ninth Riso International Symposium on Metallurgy and Materials Science, 1988, Jensen, et al: "Determination of fibre orientations in composites with short fibres", pp. 413–420.

METHOD FOR THE PREPARATION OF METAL MATRIX COMPOSITE MATERIALS

FIELD OF THE INVENTION

The present invention relates to a method for deagglomerating and providing a substantially uniform coating on reinforcing fibres and/or particles, whereby it is possible to obtain a uniform distribution of the fibres and/or particles in a metal matrix composite material, to a method for the preparation of reinforced metal matrix composite materials comprising such fibres and/or particles, and to fibres and/or particles and metal matrix composite materials produced by said methods.

TECHNICAL BACKGROUND

It has been recognized for many years that medium- and low-strength materials such as plastics, aluminium, etc. can be reinforced by fibres (often referred to as "whiskers") and/or particulates of strong materials such as silicon carbide. Whiskers are small single crystal fibres which can be mixed with, for example, a powdered metal or plastic to form a composite material. The whiskers have extremely high values of strength, elastic modulus, heat resistance and chemical stability, and can be used to reinforce and greatly improve the mechanical properties of other materials. In addition, it is also possible to use such whiskers in order to achieve specific physical and chemical properties, for example controlled thermal and electrical conductivity.

Metal matrix composites are materials which comprise a metallic phase consisting of a matrix of a metal or an alloy, and generally up to about 50% by volume of strong reinforcing fibres and/or particles. When the fibres and/or particles are primarily used for the purpose of improving the mechanical properties of the metal matrix composite, they will generally be present in an amount of not more than about 30% by volume, while amounts greater than 30% by volume may be employed when the fibres and/or particles are, for example, used in order to improve other physical properties of the matrix. The reinforcing fibres or particles are composed of materials which are significantly stronger than the metal or alloy of the matrix, and the metal matrix is thereby strengthened to an extent depending upon the strength of the reinforcing fibres or particles and the amount of reinforcing fibres or particles included in the composite material. Such fibres or particles normally have a diameter of about 0.1–5 µm and a ratio between length and diameter of, for example, about 1–100. These metal matrix composite materials are primarily fabricated by powder metallurgical techniques, fusion metallurgy or diffusion bonding, followed by secondary fabrication involving conventional metalworking processes such as extrusion, cold-rolling or drawing.

Aluminium based metal matrix composites are of great interest, in particular in the automotive and aerospace industries, due to their relatively high specific strength and low weight. The aluminium or aluminium alloy matrix in such materials can be reinforced by means of continuous or short fibres, whiskers or particles which have a much higher strength and elastic modulus than the matrix.

While the advantages of using fibres of, for example, SiC are theoretically well defined, it has been very difficult to properly mix the fibres with other substances due to their pronounced tendency to agglomerate. The agglomeration of the SiC fibres which occurs is believed to be caused by electrostatic forces arising from the build-up of charges on the surface of the fibres. SiO groups also occur on the surface of the fibres, and it is believed that this results in the formation of SiOH groups, which in turn results in hydrogen bonding between the individual fibres and thus contributes to their agglomeration. When mixed with other materials, the agglomerated state of the fibres will lead to the formation of a non-homogeneous composite of lower mechanical strength than that of an otherwise equivalent material with uniformly distributed fibres.

In order to achieve the maximum benefits of fibre reinforcement, it is necessary to thoroughly and uniformly disperse the fibres in the material. Such a dispersion requires thorough deagglomeration and mixing without any substantial damage to the fibres.

In U.S. Pat. No. 4,632,794 and U.S. Pat. No. 4,634,608, it is taught that an agglomerated whisker mass can be deagglomerated prior to mixing by treating it with a polar solvent, e.g. water or a polar organic solvent such as an alcohol or a ketone. It is especially interesting to note that the deagglomeration treatment is so crucial and so difficult that the above-mentioned U.S. Pat. No. 4,634,608 describes a complex two-stage procedure in which the whiskers are first mixed in one polar solvent to form a slurry, which is then dried, after which the whiskers are mixed with another polar solvent. It is claimed that a better deagglomeration is obtained with this two-step procedure, but even with this method, the results do not appear to be completely satisfactory, since the specification recommends that the second slurry be sieved in order to remove any agglomerates which are still present. This is also the case with the process according to the above-mentioned U.S. Pat. No. 4,632,794, which includes a step in which the dispersion of whiskers is passed through a sieve to separate out any insufficiently dispersed whisker agglomerates.

In the preparation of objects based on a metal matrix composite, as-supplied composite billets are often exposed to high temperatures for remelting and casting into a near-net shape, in other words a shape which is almost the final shape of the finished object. Metal matrix composite objects prepared by casting are also subject to high temperatures during the casting process. These processes may however lead to severe chemical attack at the reinforcement-matrix interface, and the development of metal matrix composites has to a certain extent been limited by these high-temperature reactions which degrade the reinforcement. This is for example the case with unprotected SiC whiskers, which are thermodynamically unstable in most aluminium alloys. The main reaction between liquid aluminium and SiC is:

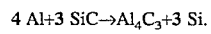

4 Al+3 SiC→Al$_4$C$_3$+3 Si.

As explained in detail below, it has been found according to the invention that it is possible to provide reinforcing fibres and/or particles, e.g. SiC whiskers, with a protective coating which may serve to reduce chemical reaction at the interface between the fibres and/or particles and the metal or alloy of the matrix.

BRIEF DISCLOSURE OF THE INVENTION

It has now been found that it is possible to produce deagglomerated fibres for use in the preparation of metal matrix composites by dispersing the fibres in an inorganic colloid sol. The present invention provides a method which gives a practically complete deagglomeration of the reinforcing fibres in a single treatment, and which at the same time eliminates the need for organic solvents such as alcohols, acetone and other ketones with their inherent costs and dangers. The method involves dispersing the fibres in an inorganic colloid sol, followed when necessary by drying, after which the deagglomerated fibres are used to produce a metal matrix composite material with improved strength.

Thus, one aspect of the present invention relates to a method for preparing deagglomerated fibres and/or particles and for providing said fibres and/or particles with a substantially uniform coating, said fibres and/or particles being of a material selected from the group consisting of carbides, oxides, nitrides, silicides, borides, metals and graphite, including SiC, TiC, ZrC, WC, NbC, AlN, TiN, BN, $Si_3N_4$, MgO, $Al_2O_3$, $SiO_2$, $ZrO_2$, $Fe_2O_3$, $Y_2O_3$, steel, tungsten, molybdenum and carbon, the method comprising (a) preparing an inorganic colloid sol, and (b) mixing the fibres and/or particles with the inorganic colloid sol to produce a dispersion in which the fibres and/or particles are deagglomerated and substantially homogeneously distributed.

As mentioned above, this method provides the further advantage of allowing the fibres and/or particles to be provided with a substantially uniform protective coating which reduces reactivity of the material of the fibres and/or particles towards a metal or alloy with which the fibres are to be mixed, in particular reactivity as a result of high temperatures.

For the preparation of metal matrix composites by casting, the dispersion of deagglomerated fibres and/or particles will typically be dried before being employed for the preparation of a metal matrix composite. For use in powder metallurgy techniques or for the preparation of a sandwiched metal matrix composite, the dispersion of fibres and/or particles may be employed in the wet state without initial drying or, alternatively, after drying.

In a further aspect, the present invention thus relates to a method for preparing a metal matrix composite, the method comprising mixing dried deagglomerated fibres and/or particles prepared according to the above method with a powder of a metal or alloy and compacting the mixture, so as to obtain a coherent metal matrix composite material in which the reinforcing fibres and/or particles are substantially homogeneously distributed.

As mentioned above, the wet dispersion of deagglomerated fibres and/or particles may also be used for the preparation of a metal matrix composite together with a metal powder. This aspect of the invention thus relates to a method for preparing a metal matrix composite, the method comprising mixing a dispersion of deagglomerated fibres and/or particles prepared according to the above method with a powder of a metal or alloy, drying and compacting the mixture, so as to obtain a coherent metal matrix composite material in 1 which the reinforcing fibres and/or particles are substantially homogeneously distributed.

In accordance with that which is explained above, a compacted metal matrix composite may be shaped by remelting into a final net or near-net shape, the coating around the fibres and or particles being a protective coating which under the remelting process reduces reactivity of the fibres and/or particles towards the metal or alloy of the matrix.

The present invention also relates to a method for preparing a matrix composite, the method comprising mixing dried deagglomerated fibres and/or particles prepared according to the above method with a molten metal or alloy and allowing the mixture to solidify, so as to obtain a coherent metal matrix composite material in which the reinforcing fibres and/or particles are substantially homogeneously distributed.

Another aspect of the present invention relates to a method for preparing a sandwiched metal matrix composite comprising alternate layers of (A) a metal or alloy and (B) reinforcing fibres and/or particles, the method comprising (a) applying a thin layer of reinforcing fibres and/or particles prepared according to the above method to a metal or alloy foil, the layer optionally being in the form of a dispersion of the reinforcing fibres and/or particles, in which case the layer is subsequently dried, covering the layer of reinforcing fibres and/or particles with another layer of metal or alloy foil, (b) adding further layers as desired according to step (a), and (c) compacting the composite.

DETAILED DESCRIPTION OF THE INVENTION

Figure 1:
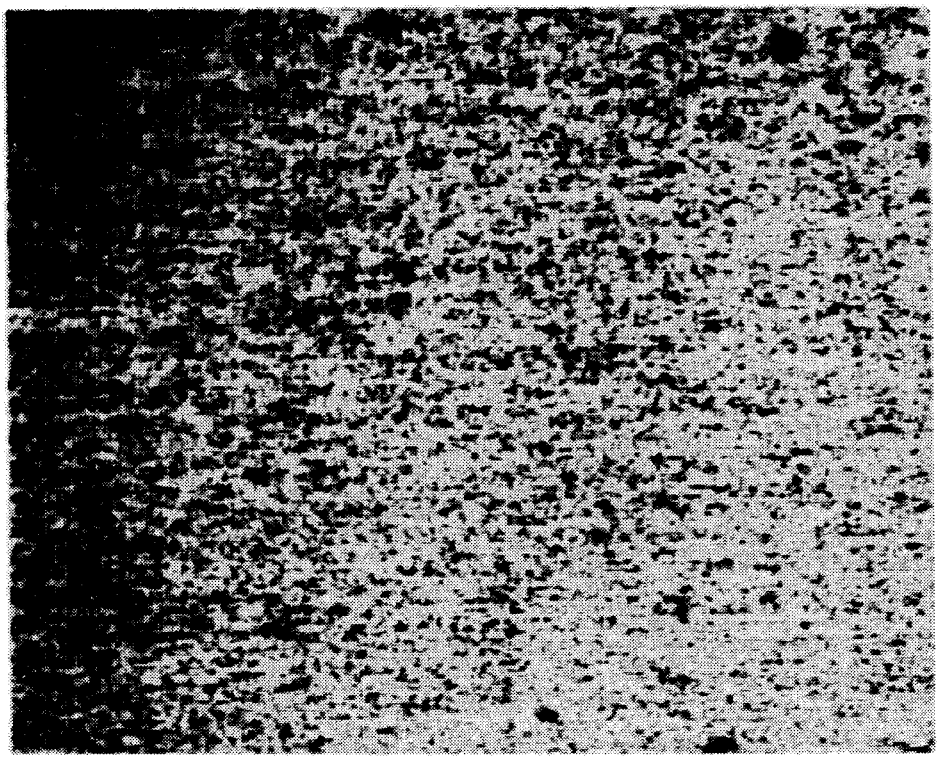
FIG. 1 shows a 100× enlargement of an aluminum matrix composite prepared by subjecting SiC whiskers to a dispersion and deagglomeration treatment.

The term "reinforced composite material" or "metal matrix composite" in the context of the present invention is understood to mean a material having a matrix of a metal or an alloy and additionally comprising 1–50% by volume of reinforcing fibres and/or particles having at least one dimension of at least about 1–2 μm distributed in the matrix.

The inorganic colloid sols which are used for the deagglomeration and dispersion of the reinforcing fibres and/or particles typically comprise polymers derived from polymeric forms of oxides, e.g. metal or metalloid oxides, preferably oxides selected from the group consisting of oxides of Al, Si, Zr, Ni, Ce, Y and Ti. The colloids may be further characterized as consisting of a single linear or branched chain of atoms or small groups of chains of atoms, the groups typically consisting of from 1 to 10 polymer chains. A preferred colloid sol for use in the method of the invention is a colloid sol based on aluminium hydroxide. Such aluminium hydroxide-based sols are low-cost commercial products which have appeared on the market in the last few years. They, may in addition be prepared or modified as described below. Furthermore, it is contemplated that sols based on oxides-of zirconium or titanium may be of particular interest.

The sols will typically be aqueous sols, and may further comprise ethylene glycol or a polyol. The sols may also comprise ethylene glycol ora polyol with no water or only a small amount of water. The amount of ethylene glycol or polyol in an aqueous sol can vary considerably according to the particular materials employed. Thus, the sol may vary from comprising pure water and no ethylene glycol/polyol to comprising e.g. pure ethylene glycol and no water. The sol may further comprise polyethylene glycol, e.g. with an average molecular weight of about 1000–6000, typically about 2000–4000.

The colloid sols are typically prepared by hydrolysis and polymerization, typically under acidic conditions, of alkoxides of Al, Si, Zr, Ti, Ni, Ce, Y or another metal or metalloid. Short chain polymers of the type M—O—M—O—M— are formed (where M represents a metal or metalloid atom), the length and complexity of the chains being dependent inter alia upon the amount of water used for the hydrolysis. A high water/alkoxide ratio (for example about 100:1) will normally assure that a large concentration of M—OH groups are formed from the metal alkoxide, and that the M—OH groups are able to polymerize to form the desired metal oxide polymers. Condensations of the type [see Yoldas, B. E., "Modification of oxides by polymerization process" Chapter 6, *Ultrastructure Processing of Ceramics, Glasses and Composites*, International Conference, February 1983, Gainsville, Fla., Proceedings, Eds: L. L. Hench and D. R. Ulrich; James, P. F., "The gel to glass transition: chemical and microstructural evolution", *J. of Non-Crystalline Solids*, 100, 1988, pp. 93–114; and Livage, J., "Sol-gel processing of metal oxides", Chemica scripta, vol 28, 1988, pp. 9–13]:

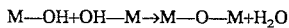

will then take place more easily, and polymers will be formed. It is also possible that the excess water acts as a solvent and allows movement of the molecules, so that the polymerization process proceeds more readily.

The hydrolysis products obtained in the presence of excess water (i.e. longer, branched polymers) are believed to be much more reactive than those obtained in the absence of excess water (shorter polymers).

An inorganic colloid sol for the deagglomeration and dispersion of particles and/or fibres may be prepared by diluting an inorganic colloid-forming powder with water or an aqueous solution to a concentration of about 0.5–10% by weight, typically about 0.5–5% by weight, preferably about 1–4% by weight, more preferably about 1–3% by weight, optionally followed by stirring, aging and boiling.

As mentioned above, the hydrolysis of the colloid-forming powder to form the desired polymers typically takes place under acidic conditions. It has been found that in order to obtain the desired deagglomeration and dispersion of the fibres and/or particles, it is important that the pH of the sol be carefully controlled. Thus, the pH value of the sol should be adjusted to about 1–9, typically about 1–4, more typically about 1–3. In particular, when the sol comprises oxides of Al or Si, the pH should be adjusted to about 1–4, preferably about 1–3, in particular about 2. The pH may be adjusted by using various inorganic or organic acids, for example nitric acid, hydrochloric acid or acetic acid.

The inorganic colloid-forming powder is advantageously added gradually to the water or aqueous solution over a period of, for example, a few minutes, and while stirring. To allow for the proper formation of the desired polymers, the sol is then typically subjected to further stirring, optionally followed by aging. Stirring may be continued for a further period of, e.g., about 1–10 hours, such as about 4 hours. Subsequent to stirring, the sol is then preferably aged for a period of, e.g., about 3–50 hours, typically about 5–40 hours, preferably about 15–20 hours.

It has been found that particularly good results are obtained when the sol is subjected to an activation treatment consisting of stirring (at a low concentration and low pH as mentioned above), aging and heating. The heating step is carried out as gentle boiling for a period of about 2–10 hours, typically about 5 hours.

Under the boiling process, the sol is typically concentrated to a concentration which provides the best deagglomeration and dispersion of the fibres and/or particles. The concentration of the sol after boiling is normally about 1–25% by weight, preferably about 2–20% by weight, more preferably about 4–10% by weight.

The initial preparation of the sol, i.e. prior to concentration by boiling, is typically carried out at room temperature. It is important to note that the pH of the sol should be controlled and adjusted as necessary throughout the entire process, as well as during the subsequent dispersion of the fibres and/or particles in the sol.

The term "reinforcing fibres and/or particles" or "fibres and/or particles" in the context of the present invention refers to fibres or particles having at least one dimension of at least about 1–2 µm, and having a diameter of about 0.1–100 µm, for example about 0.2–10 µm, preferably about 0.5–5 µm, typically about 0.5–2 µm, in particular about 0.5–1 µm, and a ratio between length and diameter of from about 1:1 to 100:1. Thus, such fibres or particles can vary from being more or less spherical to being in the form of a fibre or whisker. They can additionally be in the shape of platelets or discs, or they can have an irregular shape. However, they will typically be in the form of fibres or whiskers with, for example, a diameter of about 0.1–1 µm and a length of about 10–50 µm, more typically a diameter of about 0.5–1 µm and a length of about 30–50 µm.

The fibres and/or particles may be composed of any suitable material which increases the strength of the matrix. Such fibres will often be used for the preparation of materials which are to be used under high temperature conditions. For such materials, the fibres and/or particles will be chosen so as to have a melting point which is sufficiently high to ensure that they are not adversely affected by the high temperatures to which the composite material is subjected. A particularly suitable material for use according to the present invention is SiC whiskers. For the preparation of metal matrix composite materials with a matrix of aluminium or an aluminium alloy, such SiC whiskers may advantageously be treated with a sol based on aluminium hydroxide in order to be substantially uniformly coated with a layer of aluminium oxide. The layer of aluminium oxide will suitably have a thickness of about 5–100 nm, typically about 10–60 nm, preferably about 15–40 nm.

The fibres and/or particles are advantageously gradually added to the colloid sol while stirring. The resulting suspension is then typically subjected to additional stirring followed by aging, in order to achieve a thorough deagglomeration and dispersion of the fibres and/or particles. The stirring and aging steps are each typically carried out for a period of from a few minutes to several hours, for example by stirring for about 30 minutes and then aging for about 30 minutes.

It is believed that the colloid sol is effective in dispersing fibres or particles of SiC or other materials because the oxide polymers of the sol become strongly adsorbed to the surfaces of the fibres or particles, so that agglomerates of fibres or particles are broken up and the individual fibres or particles are kept apart from each other by the repelling force of the adsorbed polymers. The adsorbed polymers thus act as dispersing agents in aqueous suspensions by actions similar to those of adsorbed organic polymers.

It is believed that the adsorbed polymers become chemisorbed after a suitable length of time (hours to days), and bonds of the type M—O—M' (M being the metal or metalloid of the colloid and M' being the metal or metalloid of the fibres or particles) form at the surface of the fibres or particles.

After mixing with the fibres and/or particles, the colloids of the sol thus bind to the surface of the fibres or particles and form a thin, uniform coating layer around each individual fibre or particle, thereby preventing direct contact between the fibres or particles. The fibres or particles are therefore very effectively dispersed.

In addition to providing an effective dispersion and deagglomeration of the fibres and/or particles, the coating may as mentioned above serve to reduce chemical reaction at the interface with the metal or alloy of the matrix. By use of the method of the invention it is e.g. possible by use of an alumina sol to provide SiC whiskers with a thin alumina coating in amounts which are comparable to the alumina surface layer which exists on aluminium powder used in materials based on aluminium or an aluminium alloy. Such an alumina sol technique thus offers the combined advantage of a treatment which produces an interface layer on the SiC whiskers, reducing interfacial reaction with the matrix, while simultaneously promoting uniform whisker distribution in the matrix. Furthermore, as shown below in the Examples, a substantial improvement in mechanical properties has been achieved in metal matrix composites produced using whiskers which have been treated according to the method of the invention.

It may in certain cases be of interest employ the method according to the invention in such a way that the fibres and/or particles are provided with more than one coating layer, in order to enhance protection of the reinforcing fibres and/or particles and to enhance the bonding strength between the reinforcement and the matrix. For example, it may be desirable to first provide the fibres and/or particles with a coating of e.g. zirconium oxide followed by a coating of e.g. aluminium oxide.

Thus, a dispersion of reinforcing fibres and/or particles in an inorganic colloid sol may be dried, after which the fibres and/or particles are mixed with at least one different inorganic colloid sol and dried as required, so as to provide the fibres and/or particles with a multiple-layer coating.

For use in the preparation of metal matrix composites in which the reinforcing fibres and/or particles are to be mixed with, e.g., a molten metal or alloy, the dispersion of fibres and/or particles is normally dried subsequent to the deagglomeration of the fibres or particles. The dispersion will also often be dried for use in the preparation of metal matrix composites using a powder of a metal or alloy. Drying can be accomplished by various means, including the use of heat and a vacuum. Thus, the dispersion may dried in a vacuum at a temperature of between 20° C. and 900° C., typically between 30° C. and 500° C., preferably between 40° C. and 450° C., more preferably between 50° C. and 150° C., in particular about 80° C. The dispersion may also be dried using a two-step process in which it is first dried in a vacuum at a temperature of between 20° C. and 500° C., preferably between 30° C. and 450° C., more preferably between 50° C. and 150° C., in particular about 80° C., followed by drying in air at a temperature of between 300° C. and 600° C., preferably between 400° C. and 500° C., e.g. at about 450° C. In addition, the dispersion may be dried in a thin layer at a temperature of about 50°–100° C., in particular about 80° C.

The various routes typically employed for preparing a metal matrix composite using powder metallurgy or fusion metallurgy techniques may be summarized as follows:

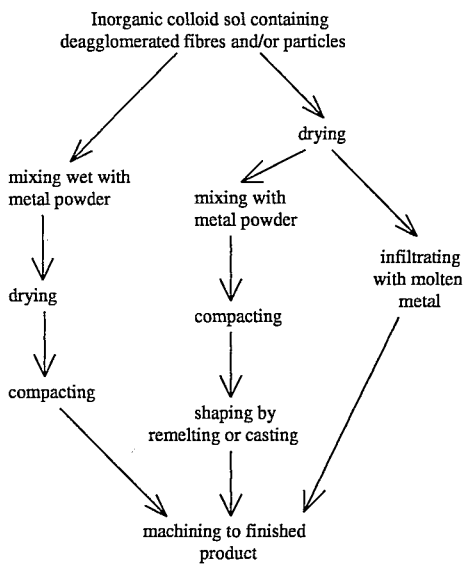

For use in the preparation of a sandwiched metal matrix composite, the dispersion of deagglomerated fibres and/or particles will typically be applied to a metal or alloy sheet or foil prior to drying.

The actual preparation of the metal matrix composites with the deagglomerated reinforcing fibres and/or particles may be accomplished by procedures which are well known in the art. The matrix, which constitutes about 50% to about 99% of the volume of the metal matrix composite prepared according to the invention, may comprise a metal such as Al, Zr, Mg, Ti, etc. or an alloy which comprises one or more of these metals.

It has in particular been found that the method of the invention is useful for the preparation of metal matrix composites of aluminium or an aluminium alloy. Such an alloy may be of any type which is normally employed in the production of high-strength aluminium alloy materials, or which is suitable for use in such materials (see for example "*Metals Handbook, Ninth Edition, Volume 2, Properties and Selection: Nonferrous Alloys and Pure Metals*", American Society for Metals, Metals Park, Ohio, 1879). An aluminium alloy will typically comprise a variety of different elements, and will often include about 0–20% by weight of Mg, Mn, Cu, Zn and/or Li. The alloy may additionally comprise Si, Fe, Co, Ni and/or Cr.

A particularly preferred material which may be prepared according to the invention is a metal matrix composite comprising aluminium or an aluminium alloy and SiC whiskers.

A metal matrix composite may as mentioned above be prepared by powder metallurgical techniques. The process may for example include ball milling, followed by cold compaction, degassing, hot compaction and extrusion, as is well known in the art. Compaction to consolidate the material to full density is typically accomplished by cold and/or hot compaction, e.g. by rolling and/or compressing. Cold compaction is typically carried out at a temperature of around room temperature, while hot compaction is typically performed at a temperature of about 300°–600° C., for example from about 400° C. to about 600° C. Degassing, e.g. between the cold and hot compaction, is typically accomplished in a vacuum at a temperature of about 300°–500° C. The compaction process results in a material having substantially full density. Finally, the composite material is typically extruded in order to increase the material's strength, in particular under high temperature conditions. The extrusion temperature can vary from about room temperature to about 550° C. or even higher, and will typically be about 300°–550° C. The degree of deformation, which is defined as the reduction in the cross-sectional area of the material, is typically in the range of about 10–99%. The extruded metal matrix composite may subsequently be further deformed by conventional metal forming processes.

A metal matrix composite may also be prepared by mixing the dried deagglomerated fibres and/or particles with a molten metal or alloy and subsequently allowing the molten mixture to solidify, e.g. according to conventional fusion metallurgy techniques. Such composites are after solidification typically subjected to deformation, e.g. by extrusion as described above.

As mentioned above, a sandwiched metal matrix composite comprising alternating layers of a metal or alloy foil and the deagglomerated, coated reinforcing fibres and/or particles may be prepared. The layers of fibres and/or particles applied to the foil will often have a thickness corresponding to about 2 or 3 fibres, but may also be thicker, e.g. corresponding to about 10 or even 100 fibres and/or particles. The metal or alloy foil will typically have a thickness in the range of about 5–20 μm, e.g. about 10 μm, but it may also be up to about 100 μm or even 1 mm thick. If desired, a wet dispersion of the reinforcing fibres may be applied to the metal or alloy foil by extrusion, thereby aligning the fibres. The compaction of the composite material in the case of a sandwiched metal matrix composite may be accomplished by conventional means, e.g. as described above for materials prepared by powder blending.

The metal matrix composite materials prepared according any of the above-described methods, i.e. by powder metallurgy using either dried or non-dried fibres and/or particles, by fusion metallurgy or in the form of a sandwiched metal matrix composite, will typically be machined to a finished product in a conventional manner.

The metal matrix composites produced according to the present invention have a highly uniform structure and a superior strength compared to materials produced by previously described methods. The lack of agglomerates of fibres or particles in the materials means that the full reinforcing benefit of the fibres or particles is achieved, thus resulting in strength characteristics which approach the theoretical limit for such materials. It has thus been shown that materials produced according to the method of the invention have a strength which is on the order of about 15% greater than otherwise equivalent materials produced according to conventional methods.

Furthermore, the novel method by which the fibres or particles are dispersed in the production of these superior materials is simpler than the prior art methods.

The materials produced by this method are characterized by having a metal oxide content which is higher than normal, since there in addition to an oxide content in, for example, an aluminium material of about 1% (the oxide originating in the aluminium powder), is an extra approximately 4% which originates from the dispersion of fibres or particles. This is due to the fact that the hydroxide component (e.g. aluminium hydroxide) of the colloid used in the sol is converted to oxide (e.g. aluminium oxide) under heat and pressure, i.e. during hot compaction and extrusion. The oxide content is therefore increased in comparison to the amount which typically is present in materials produced by other methods.

This increased oxide content may be observed by TEM (transmission electron microscopy) as the above-mentioned substantially uniform coating layer of alumina surrounding fibres which have been dispersed and deagglomerated with an aluminium hydroxide sol.

The invention will be further illustrated by the following non-limiting examples.

EXAMPLE 1

500 ml of distilled water was brought to a pH of 2 by adding a few drops of 12% $HNO_3$ (concentrated (60%) $HNO_3$ diluted 1:4 with water), and the acidified water was stirred for 1 minute. 10 g of boehmite alumina (AlOOH) powder (Condea, W. Germany) was slowly added to the water over a period of 10 minutes while stirring, resulting in a 2% by weight suspension. During the addition of the boehmite alumina powder, the pH of the suspension was maintained at a value of 2 by adding diluted $HNO_3$ as necessary. The suspension was then stirred for approximately 4 hours while maintaining a pH of 2, after which it was allowed to age for 20 hours. After aging, the suspension was concentrated by evaporating part of the water by gentle boiling for about 5 hours. The suspension was at the same time stirred and the pH was maintained at 2 by adding $HNO_3$. A translucent, bluish sol with a concentration of 4% by weight was obtained.

6 g of SiC whiskers (approximately 0.5 μm×30 μm) were gradually added with continuous stirring to 20 ml of the aluminium hydroxide sol prepared above. The pH of the suspension was maintained at 2 by adding $HNO_3$ as necessary in order to ensure the best possible dispersion of the SiC whiskers. The viscous suspension of SiC whiskers was then stirred for 30 minutes, aged for an additional 30 minutes and then dried in a vacuum overnight at a temperature of 80° C., giving a dried, brittle SiC body, which was used for the preparation of a metal matrix composite as described below. Except where otherwise noted, the process was performed at room temperature.

A metal matrix composite comprising 10% by volume of the deagglomerated SiC whiskers was prepared by mixing 11.2 g of the dried, brittle SiC body with 90 g of aluminium powder (average particle diameter 6.4 μm) having an oxide content of about 1% in the form of oxidized aluminium on the surface of the particles. Mixing was accomplished by ball milling with alumina balls for 20 hours. The mixture was then subjected to conventional powder metallurgy processing: cold pressing at 30 kg/mm$^2$ for not more than 10 seconds, degassing at 450° C. for 6 hours in a vacuum ($10^{-5}$ mm Hg), hot pressing at 550° C. and 57 kg/mm$^2$ for 5 minutes and extrusion at 500° C. with a reduction ratio of 15:1.

EXAMPLE 2

An aluminium hydroxide-based sol was prepared according to the method of Example 1 above with the following exceptions: 5 g of boehmite alumina powder was added to 1 l of distilled water, resulting in a 0.5% by weight suspension, which after stirring and aging was concentrated by boiling to give a sol with a concentration of 10% by weight.

A suspension of SiC whiskers was prepared as in Example 1 by mixing 6 g of SiC whiskers with 20 ml of the 10% sol prepared above. Following stirring for 30 minutes and aging for another 30 minutes, the suspension was dried in a vacuum overnight at a temperature of 80° C. followed by a final heat treatment in air at 450° C. for 6 hours.

The dried, deagglomerated SiC whiskers were used to prepare an aluminum matrix composite according to the procedure of Example 1.

For purposes of comparison, a metal matrix composite was prepared as described in this example, with the exception that the SiC whiskers were not subjected to a deagglomeration treatment, and with the further exception that the SiC whiskers and the aluminium powder were mixed in a blender for 1 hour. It had previously been shown that mixing in a blender provided a result which for non-agglomerated whiskers was comparable to mixing by ball milling.

Metallographic samples were prepared from the extruded composites by grinding down to No. 1000 SiC paper and polishing using 7 μm and 3 μm diamond paste. The microstructure of the samples was examined using an optical microscope.

Figure 2:
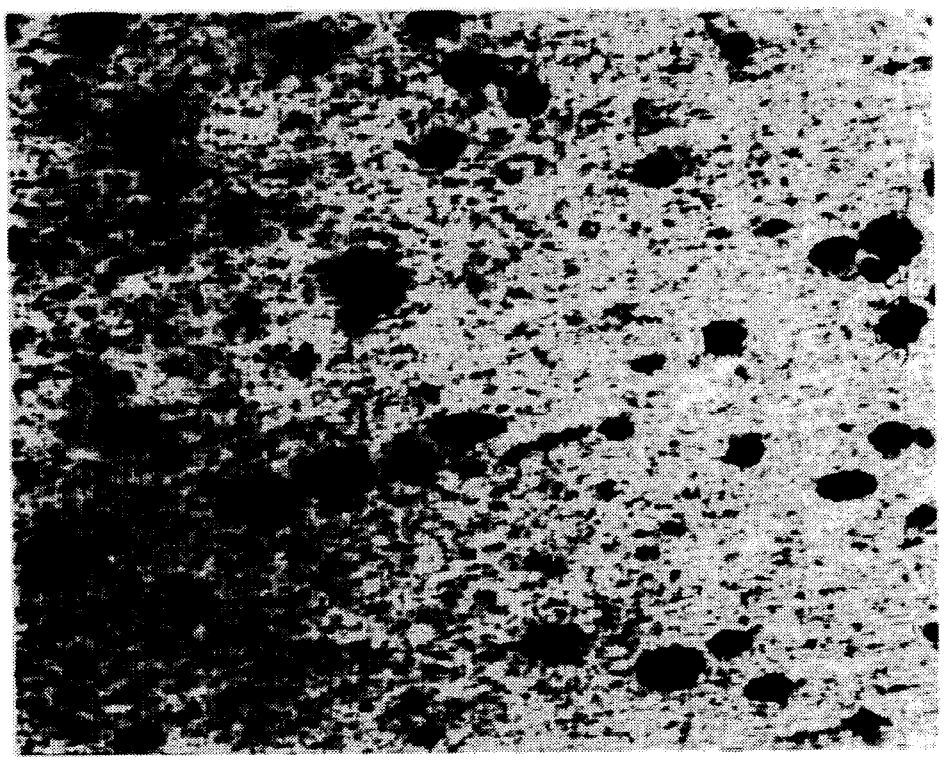
FIG. 2 shows a 100× enlargement of an aluminum matrix composite prepared without subjecting SiC whiskers to a dispersion and deagglomeration treatment.

The accompanying FIG. 1 and 2 show cross-sectional views of metal matrix composites produced according to Example 2 using a deagglomeration treatment for the SiC whiskers (FIG. 1) and without such a deagglomeration treatment (FIG. 2).

FIG. 1 shows a 100× enlargement of an aluminium matrix composite prepared as above comprising 10% by volume of SiC whiskers, the SiC whiskers having been subjected to a deagglomeration treatment using a 10% aluminium hydroxidebased sol as a dispersant. It can be seen that the microstructure of the material is substantially free of agglomerates of SiC whiskers.

FIG. 2 shows a 100× enlargement of a similar aluminium matrix composite comprising 10% by volume of SiC whiskers, the material having been prepared without subjecting the whiskers to a dispersion and deagglomeration treatment. The black spots, which have a size of about 50–100 μm, are agglomerates of SiC whiskers.

EXAMPLE 3

100 ml of a new developmental sol "10/2" (Condea, W. Germany), comprising 10% by weight boehmite alumina and 90% water and having an initial pH of 4, was brought to a pH of 3 by the addition of a few millilitres of 12% $HNO_3$ (concentrated (60%) $HNO_3$ diluted 1:4 with water), and the suspension was then stirred for 10 minutes. 150 ml of distilled water was added to the suspension while stirring, resulting in a concentration of 4% by weight, the pH being maintained at 3 during the addition by adding diluted $HNO_3$ as necessary. The suspension was then stirred for approximately 4 hours while maintaining a pH of 3, after which it was allowed to age for 20 hours. A translucent, bluish sol was obtained.

9 g of SiC whiskers (approximately 0.5 μm×30 μm) were gradually added with continuous stirring to 20 ml of the aluminium hydroxide sol prepared above. The pH of the suspension was maintained at 3 by adding $HNO_3$ as necessary in order to ensure the best possible dispersion of the SiC whiskers. The viscous suspension of SiC whiskers was then stirred for 30 minutes, aged for an additional 30 minutes and then dried in a vacuum overnight at a temperature of 80° C. after pouring it onto a plastic sheet and spreading it into a thin layer. Except where otherwise noted, the process was performed at room temperature.

The dried, deagglomerated SiC whiskers were used to prepare an aluminum matrix composite according to the procedure of Example 1, with the exception that mixing by ball milling was carried out for only 5 hours. It was observed using an optical microscope that the composite was substantially free of agglomerates of SiC whiskers.

EXAMPLE 4

200 mg of SiC whiskers (approximately 0.5 lμm×30 μm) were gradually added with continuous stirring to 5 ml of polyethylene glycol with a molecular weight of about 2000 to which 0.4 ml of a boehmite alumina sol prepared as in Example 2 had been added. A suspension was formed by sonicating the mixture in a Metason 100 ultrasonic bath for approximately 3 minutes.

The suspension was subsequently observed in a stereo microscope. It could be seen that the SiC fibres in the suspension were free floating single fibres, and that the suspension was essentially free of agglomerates.

EXAMPLE 5

A sol was prepared by high shear mixing of 9 g (10 ml) of ethylene glycol, 1 g of boehmite alumina and 36 mg of concentrated (60%) $HNO_3$. The high shear mixing was continued for about 30 minutes. To this sol 3 g of SiC whiskers (approximately 0.5 μm×30 μm) were gradually added with continuous stirring, the stirring being continued for another 30 minutes. The suspension was subsequently observed in a stereo microscope to be essentially free of agglomerates. This suspension is particularly suitable for mixing with aluminium powder in a wet process.

EXAMPLE 6

Silicon carbide whiskers were provided with a protective aluminium oxide coating and used for the preparation of a metal matrix composite.

The whiskers (Tokai Carbon Co. Ltd., Japan) consisted of β-type cubic crystal structure SiC whiskers 0.1–1.0 μm in diameter and 30–100 μm in length. An aqueous boehmite alumina sol was prepared using a commercial boehmite (AlOOH) supplied by Condea Chemie of Hamburg, West Germany. Other commercial sols, for example a boehmite sol from Vista Chemical Co., Houston, Tex., USA, have been shown to provide similar effects as those provided by the sol used in this Example. The sol was prepared as described above in Example 1.

The whiskers were coated by adding them to a sol containing 2, 4 or 10% by weight boehmite and mixing with a glass impeller at approximately 300 rpm until the suspension was quite viscous (approximately 1000 cps) and the uniform blending of further whisker additions could not be assured. Stirring was then continued for 30 minutes. The dispersions prepared typically had a final whisker concentration of about 6 g of whiskers in 20 ml of the aqueous sol containing 0.4, 0.8 or 2 g of boehmite. The treated whiskers were dried at 40° C. under a mechanical pump vacuum for 10 hours. During whisker dispersion and drying, the alumina was deposited on the whisker surfaces at thicknesses of about 7, 15 and 40 nm, corresponding to the 3 boehmite concentrations. These values were calculated assuming an average whisker diameter of 500 nm, and they will be used in the following to define the treated whiskers. After drying, the whisker mass was broken using a mortar and pestle and mixed by means of a low speed mixer with atomized aluminium powder to obtain a metal matrix composite precursor.

The aluminium powder had a mean diameter of 6.4 μm and contained 1% by weight alumina, 0.26% by weight Fe and 0.18% by weight Si. Blending of the treated whiskers with the aluminium powder was carried out using dry blending. The blended materials had a volume concentration of 2, 10 and 20% SiC (corresponding to 2.2, 11.5 and 22.2% by weight). The metal matrix composites containing the treated whiskers contained both the alumina that coated the whiskers (in the range of from 0.1 to 5% by volume depending of the coating thickness and whisker content) and the alumina present on the aluminium powder (0.8% by volume). The preparation of the metal matrix composites involved conventional hot compaction at 550° C. and extrusion at 500° C. Control samples were prepared using untreated whiskers which were blended with the same aluminium powder and subjected to identical compaction and extrusion.

The untreated and the treated SiC whiskers were investigated by scanning electron microscopy (SEM). The extruded Al-SiC composites with treated whiskers were characterized and compared with those made from untreated whiskers. The distribution of whiskers in the matrix was examined by SEM and optical microscopy. The whisker alignment was determined by a neutron diffraction technique (D. Juul Jensen, H. Lilholt and P. J. Whithers, Proc. 9th Risoe Symp. "Mechanical and Physical Behaviour of Metallic and Ceramic Composites Risoe National Laboratory, Denmark, 1988, S. I. Andersen, H. Lilholt and O. B. Pedersen, Editors, pp. 413–420). The morphology of the alumina coating was studied by transmission electron microscopy (TEM) using the microdiffraction and hollow cone beam technique. Differential thermal analysis (DTA) was performed on the extruded composites after exposure to temperatures of 700° C. and 750° C. for 1 hour. The mechanical properties were determined by tensile tests and the fracture surfaces were studied by SEM.

Results

1) Thermal stability

The chemical reaction between the matrix and whisker reinforcement was studied by heating metal matrix composites containing 10% by volume of whiskers either treated with a 40 nm thick alumina coating (treated) or untreated.

Figure 3:
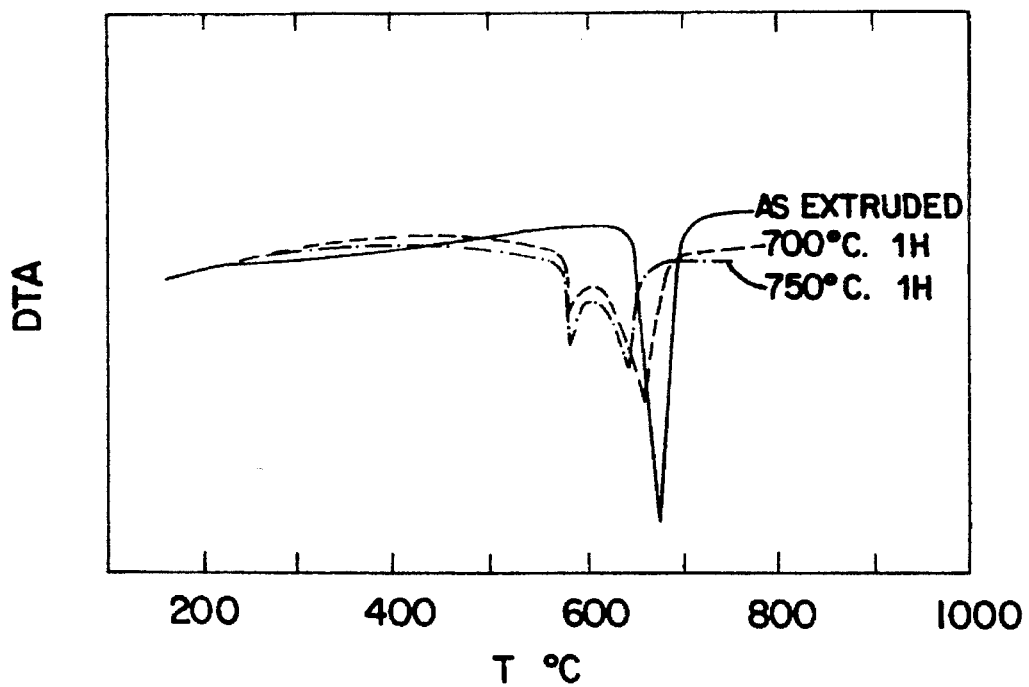
FIG. 3 (untreated)
Figure 4:
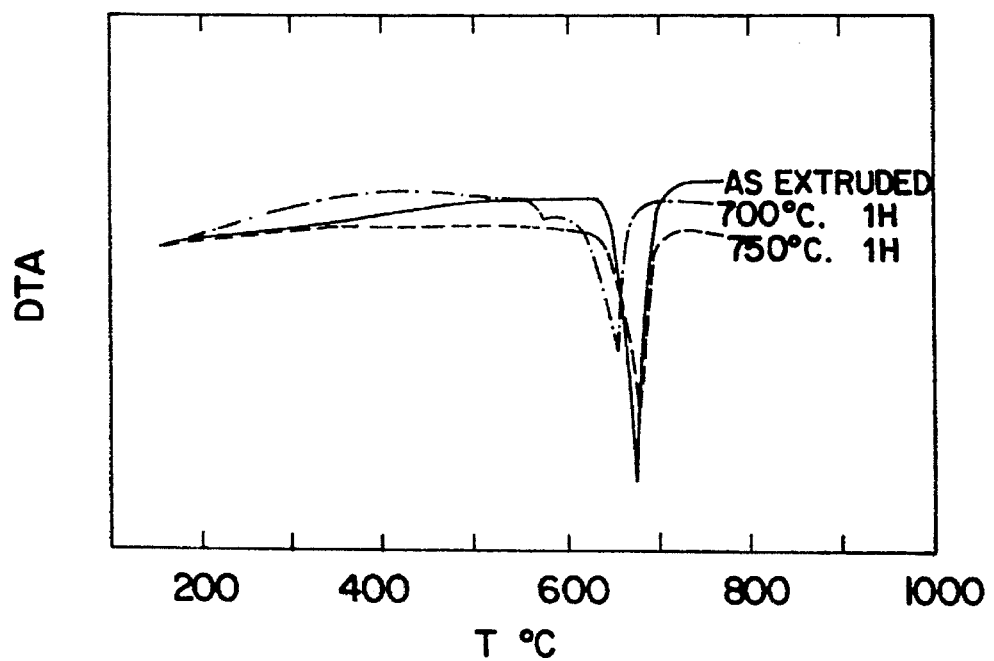
FIG. 4 (treated) show DTA curves of the composites in the as-extruded condition and after pre-heating.

FIG. 3 (untreated) and FIG. 4 (treated) show DTA curves of the composites in the as-extruded condition and after pre-heating to 700° C. and 750° C. for 1 hour. Both the untreated and the treated as-extruded composites have similar DTA curves, showing a single thermal arrest at 648° C., corresponding to the melting of the aluminium matrix. The DTA curve of the untreated composite that was previously heated to 700° C. contains two "valleys". The larger is a shift of matrix melting to 600° C. and a second smaller valley at 577° C. The treated composite shows a shift of the matrix melting to 630° C.; however, no evidence of a secondary thermal arrest is found.

When the test was carried out at a temperature of 750° C., the untreated composite showed primary melting at the lower arrest temperature of 577° C. with a slight valley at the higher temperature. The treated composite exhibited some reduction in the matrix melting temperature and only an incipient secondary arrest at 577° C.

These results indicate that temperatures above the melting point of aluminium increased the Si content of the matrix, and this Si could only be produced by the conversion of SiC into $Al_4C_3$ and Si. The results also show that the extent of the reaction has been significantly reduced in the composite with coated whiskers. The Si contents and therefore the extent of the reaction have been calculated for the materials heat-treated at 700° C. according to the Al—Si phase diagram. A lowering of the melting temperature for the treated metal matrix composite from 648° C. to about 630° C. means an increase in the Si content of from 0.18% to 0.45% by weight. The existence of the second valley at 577° C. for the DTA of the untreated composite indicates that the Si content is above 1.65% by weight, the value of the binary eutectic. This corresponds to an increase in Si to at least 1.47% by weight in the aluminium matrix, or more than 5 times the Si concentration increase calculated for the treated whiskers.

The protection effect achieved according to the invention is comparable to or better than that previously reported. The DTA data also indicate that the whiskers are uniformly coated by the alumina, because any significant localized attack on the whiskers would have been detected in the DTA curve.

2) Microstructure 2.1) Whisker dispersion

The SiC whiskers used in this example have an irregular shape with twists and other defects such as stacking faults, and have a strong tendency to form nests of entangled material.

Figure 5:
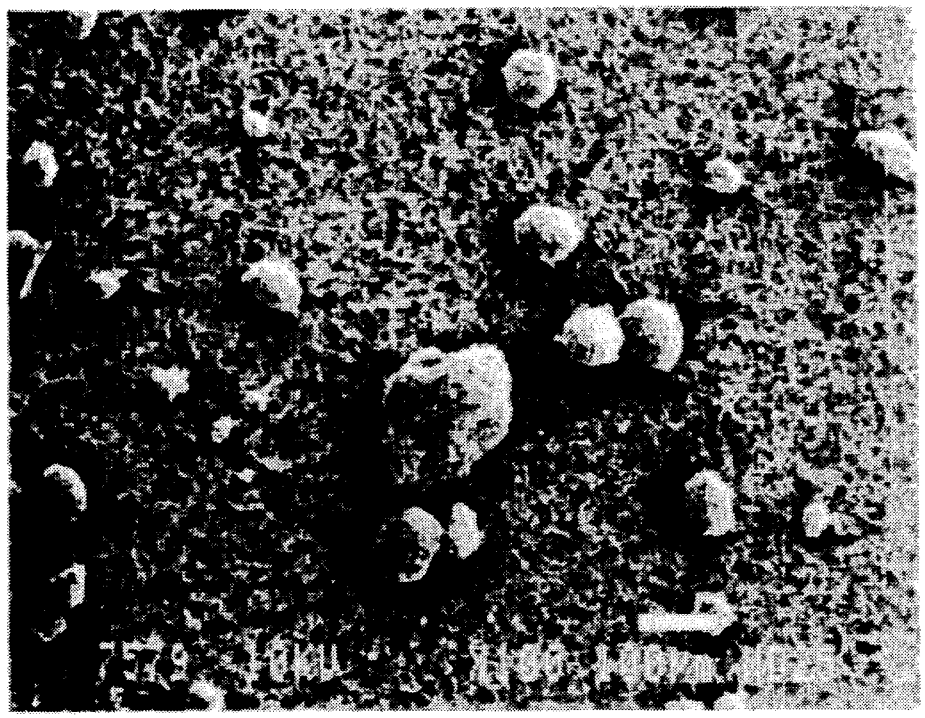
FIG. 5 shows a scanning electron micrograph of a sample of SiC whiskers as supplied.
Figure 6:
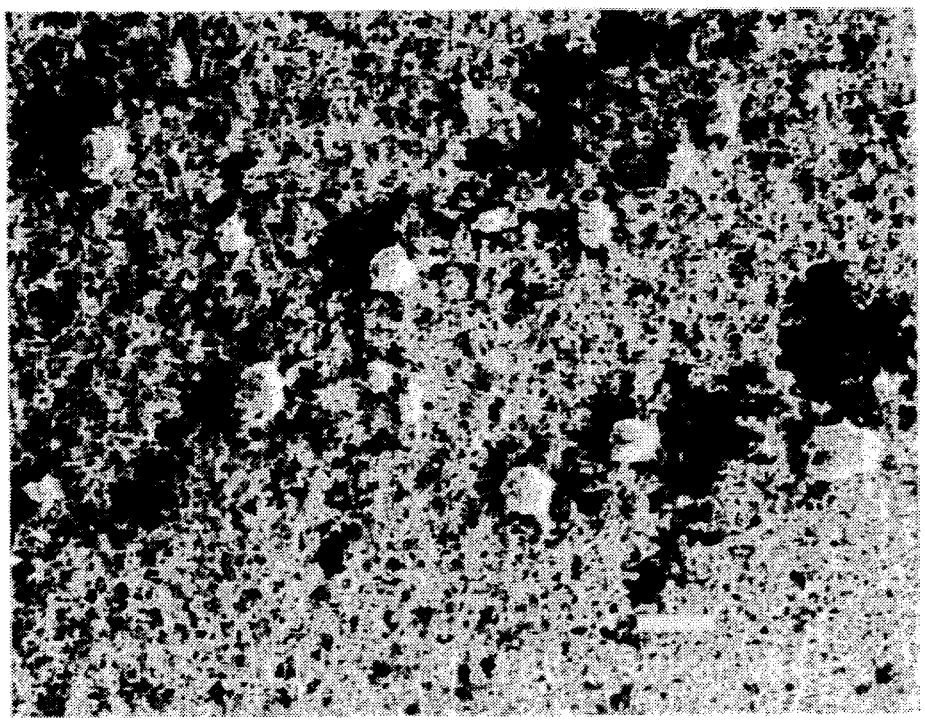
FIGS. 6–8 show scanning micrographs of the same SiC whiskers after treatment.
Figure 7:
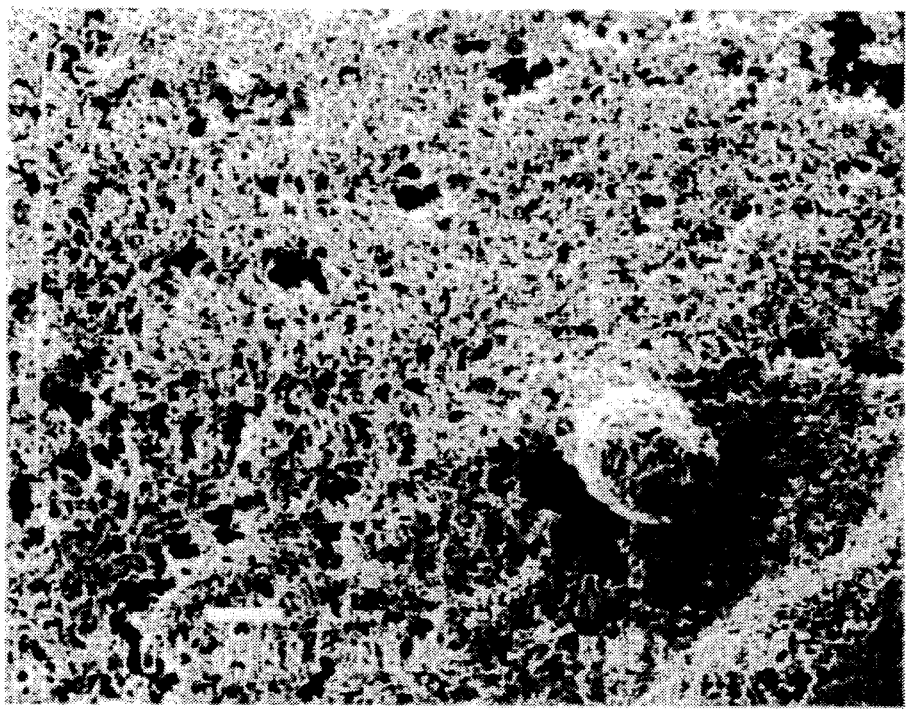
Figure 8:
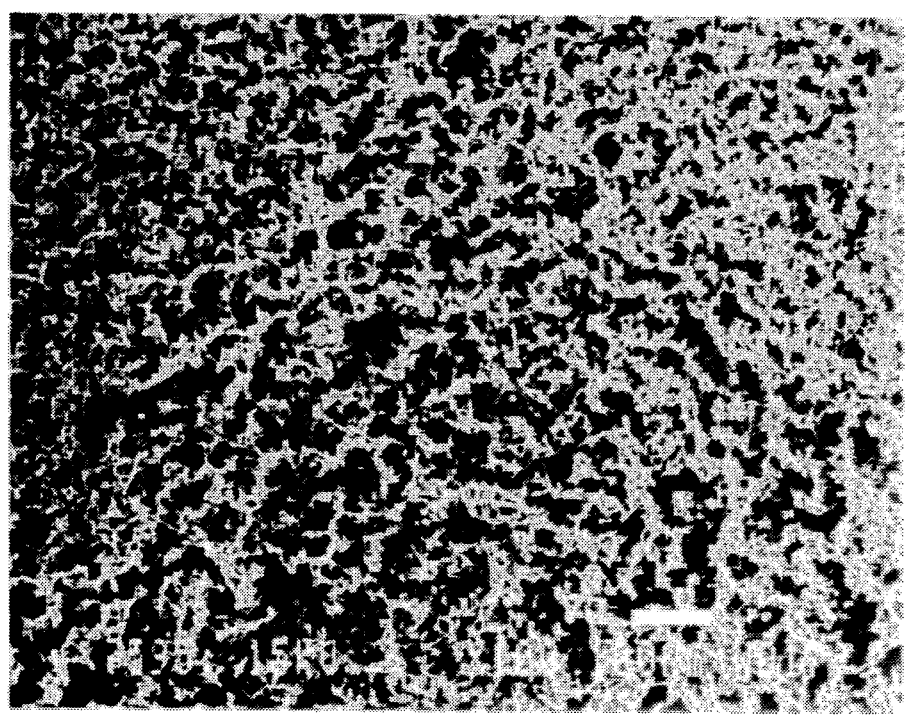

FIG. 5 shows a scanning electron micrograph of a sample of the SiC whiskers as supplied. FIGS. 6–8 show scanning micrographs of the same SiC material treated by an alumina sol process according to the invention, the alumina sols having a concentration of 2% (FIG. 6), 4% (FIG. 7) and 10% (FIG. 8) by weight.

It can been seen from FIGS. 6–8 that the whisker nests have nearly disappeared, the effect being greater when the sol is used in a greater concentration. The uniformity of the dispersion is maintained when the SiC whiskers are blended with the aluminium and compacted, as already shown in FIG. 1.

2.2) Whisker alignment

Figure 9:
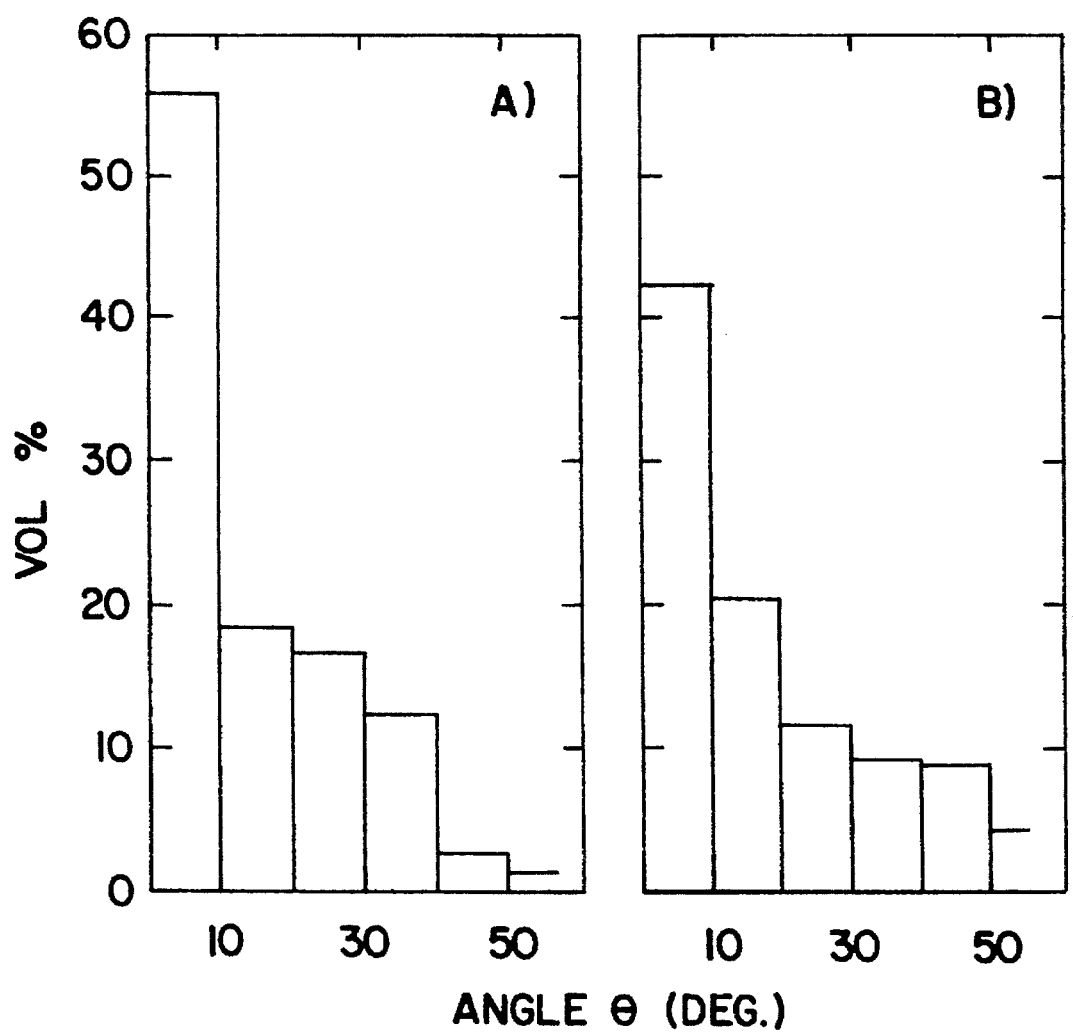
FIG. 9 shows the data on whisker alignment in extruded Al-10% SiC by volume composites as determined by neutron diffraction.

There appears to be an improvement in the alignment of the SiC whiskers in the aluminium matrix after treatment according to the invention with the inorganic colloid sol. FIG. 9 shows the data on whisker alignment in extruded Al-10% SiC by volume composites determined by neutron diffraction. 56% by volume of the whiskers are aligned within 10 degrees from the extrusion axis in the composite containing whiskers treated with the 10% sol (A) as compared. to 43% by volume for the composite containing untreated SiC whiskers (B). The improvement is related to the reduction in the concentration of agglomerates by the dispersing treatment, thus providing an increased number of SiC whiskers that are free to flow with the matrix during extrusion.

2.3) TEM observations

TEM dark field micrographs of treated SiC whiskers indicate that the surfaces of SiC whiskers treated with the 4% sol are provided with a uniformly distributed layer of aluminium oxide having a thickness of about 20 nm. This thickness agrees with the calculated value of 15 nm (see above).

3) Practical applications

The sol treatment of SiC whiskers has proven to yield positive results for protection and distribution. The smallest boehmite concentrations necessary can be deduced from FIGS. 6–8. Thus, it is indicated that a sol having a concentration of 4% by weight, i.e. 13.3% by weight alumina on SiC whiskers (15 nm coatings) provides a sufficient protective coating. Boehmite is a low cost industrial material which is readily available. Concentrations as high as 30% by weight on SiC whiskers (40 nm coatings) do not significantly affect the costs of the whiskers.

The dispersion process is quite simple and amenable to large scale production without the need for expensive equipment. The alternative process necessary to break up the nests and to disperse SiC whiskers is prolonged ultrasonic treatment in isopropanol using cooling and a large amount of energy. However, this treatment does not provide a protective barrier at the matrix-whisker interface.

4) Mechanical properties

The mechanical properties were studied for metal matrix composites containing 10% and 20% by volume of untreated SiC whiskers and SiC whiskers treated with the 4% sol, i.e. with an alumina thickness of about 15 nm.

The E-modulus, yield strength and ultimate tensile strength of the following materials was determined:

(A) a material of aluminium+10% by volume SiC whiskers, the whiskers having been subjected to a deagglomeration and dispersion treatment according to the invention, (B) a material of aluminium+10% by volume untreated SiC whiskers, (C) a material as in (A), but with 20% by volume treated SiC whiskers, and (D) a material as in (B), but with 20% by volume untreated SiC whiskers.

The materials were prepared following the method of Example 2, materials (B) and (D) being prepared with SiC whiskers which were not subjected to deagglomeration and dispersion according to the invention. Measurements were made on rod-shaped samples having a diameter of 6 mm and a length of 50 mm, using an Instron® tensile test machine. The results were as follows:

| Mechanical properties of metal matrix composites | | | |
| --- | --- | --- | --- |
| | E-modulus (GPa) | Yield strength $\sigma 0.2$ (MPa) | Ultimate tensile strength $\sigma u$ (MPa) |
| 10% by volume SiC | | | |
| (A) Treated SiC | 87 | 128 | 279 |
| (B) Untreated SiC | 77 | 112 | 228 |
| 20% by volume SiC | | | |
| (C) Treated SiC | 93 | 188 | 308 |
| (D) Untreated SiC | 85 | 139 | 221 |
| Pure Al* | 70 | — | — |

*Standard value for E-modulus for materials of pure Al prepared by conventional powder metallurgy processes The E-modulus and tensile strengths of composites containing coated whiskers are significantly greater than for those materials with uncoated whiskers. It is to be noted that the measured value of the E-modulus for materials with treated SiC whiskers is very close to the theoretically calculated value for the present aspect ratio (1/d) of 5. This is mainly due to a more effective usage of the reinforcement: no agglomerates are present, and the whiskers are better aligned. Observations of typical fracture surfaces of a metal matrix composite containing 10% by volume SiC whiskers treated according to the method of the invention indicate that an increased bond strength may be present between the SiC whiskers and the aluminium matrix, as less whisker pullout is observed for the treated whiskers than for materials prepared with untreated whiskers. Similar effects are expected to be obtained for SiC whiskers treated with the 10% sol (40 nm coating).

Conclusion

The sol treatment of the whiskers offers good protection against attack by molten aluminium. A 40 nm alumina coating appears to be sufficient to significantly reduce attack by molten aluminium on SiC whiskers at 700° C. for 1 hour. An improved distribution and alignment of the treated whiskers is also observed after extrusion. Together, these factors contribute to an increase in both strength and elastic modulus of the metal matrix composite.

We claim:

1. A method for preparing deagglomerated fibres and/or particles and for providing said fibres and/or particles with a substantially uniform coating, said fibres and/or particles being of a material selected from the group consisting of carbides, oxides, nitrides, silicides, borides, metals and graphite, including SiC, TiC, ZrC, WC, NbC, AlN, TiN, BN, $Si_3N_4$, MgO, $Al_2O_3$, $SiO_2$, $ZrO_2$, $Fe_2O_3$, $Y_2O_3$, steel, tungsten, molybdenum and carbon, the method comprising (a) preparing an inorganic colloid sol by acidifying water or an aqueous solution to a pH in the range of 1–4, after which 0.5–10% by weight of an inorganic colloid-forming powder is added to the acidified water or aqueous solution while stirring, the sol being subsequently stirred for a period of 1–10 hours and subjected to gentle boiling for a period of 2–10 hours, the pH being maintained in the range of 1–4 during stirring and boiling, to result in a sol with a colloid concentration of 1–25% by weight, and (b) mixing the fibres and/or particles with the inorganic colloid sol to produce a dispersion in which the fibres and/or particles are deagglomerated and substantially homogeneously distributed.

2. A method according to claim 1 wherein the dispersion of deagglomerated fibres and/or particles is dried.

3. A method according to claim 1 wherein the coating on the fibres and/or particles is a protective coating which reduces reactivity of the material of the fibres and/or particles towards a metal or alloy with which the fibres are to be mixed, including reactivity at high temperatures.

4. A method according to claim 1 wherein the dispersion is dried, after which the fibres and/or particles are mixed with at least one different inorganic colloid sol and dried as required, so as to provide the fibres and/or particles with a multiple-layer coating.

5. A method according to claim 1 wherein the colloids are polymers derived from polymeric forms of oxides selected from the group consisting of oxides of Al, Si, Zr, Ni, Ce, Y and Ti.

6. A method according to claim 1 wherein the sol further comprises ethylene glycol or a polyol.

7. A method according to claim 1 wherein the inorganic colloid-forming powder is added to a concentration of 0.5–5% by weight.

8. A method according to claim 1 wherein the pH value of the sol is in the range of 1–3.

9. A method according to claim 1 which includes a step of aging the sol for a period of 3–50 hours between the stirring and boiling steps.

10. A method according to claim 1 wherein the concentration of colloids in the sol after boiling is 4–10% by weight.

11. A method according to claim 1 wherein the sol comprises aluminum hydroxide and has a pH in the range of 1–3.

12. A method according to claim 2 wherein the dispersion is dried in a vacuum at a temperature of between 20° C. and 900° C.

13. A method according to claim 2 wherein the dispersion is first dried in a vacuum at a temperature of between 20° C.

and 500° C., followed by drying in air at a temperature of between 300° C. and 600° C.

14. A method according to claim 2 wherein the dispersion is spread into a layer on a support and subsequently dried at a temperature in the range of 50°–100° C.

15. A method according to claim 1 wherein the fibres and/or particles comprise SiC whiskers.

16. Fibres of a material selected from the group consisting of carbides, oxides, nitrides, silicides, borides, metals and graphite, including SiC, TiC, ZrC, WC, NbC, AlN, TiN, BN, $Si_3N_4$, MgO, $Al_2O_3$, $SiO_2$, $ZrO_2$, $Fe_2O_3$, $Y_2O_3$, steel, tungsten, molybdenum and carbon, said fibres having been deagglomerated and provided with a substantially uniform coating according to the method of claim 1.

17. SiC whiskers which are substantially uniformly coated with a layer of aluminium oxide having a thickness of 5–100 nm.

18. A method for preparing a metal matrix composite, the method comprising mixing dried deagglomerated fibres and/or particles prepared according to the method of claim 2 with a powder of a metal or alloy and compacting the mixture, so as to obtain a coherent metal matrix composite material in which the reinforcing fibres and/or particles are substantially homogeneously distributed.

19. A method for preparing a metal matrix composite, the method comprising mixing a dispersion of deagglomerated fibres and/or particles prepared according to the method of claim 1 with a powder of a metal or alloy, drying and compacting the mixture, so as to obtain a coherent metal matrix composite material in which the reinforcing fibres and/or particles are substantially homogeneously distributed.

20. A method according to claim 18 wherein the compacted metal matrix composite is shaped by remelting into a final net or near-net shape, the coating around the fibres and or particles being a protective coating which under the remelting process reduces reactivity of the fibres and/or particles towards the metal or alloy of the matrix.

21. A method for preparing a metal matrix composite, the method comprising mixing dried deagglomerated fibres and/or particles prepared according to the method of any one of claim 2 with a molten metal or alloy and allowing the mixture to solidify, so as to obtain a coherent metal matrix composite material in which the reinforcing fibres and/or particles are substantially homogeneously distributed.

22. A method for preparing a sandwiched metal matrix composite comprising alternate layers of (A) a metal or alloy and (B) reinforcing fibres and/or particles, the method comprising (a) applying a thin layer of reinforcing fibres and/or particles prepared according to the method of claim 1 to a metal or alloy foil, the layer optionally being in the form of a dispersion of the reinforcing fibres and/or particles, in which case the layer is subsequently dried, covering the layer of reinforcing fibres and/or particles with another layer of metal or alloy foil, (b) adding further layers as desired according to step (a), and (c) compacting the composite.

23. A method according to claim 22 wherein a wet dispersion of the reinforcing fibres is applied to the metal or alloy foil by extrusion, thereby aligning the fibres.

24. A method according to claim 18 wherein the metal matrix comprises aluminum or an aluminum alloy and the reinforcing fibres and/or particles comprise SiC whiskers.

25. A metal matrix composite produced according to the method of claim 21.

26. A metal matrix composite according to claim 25 comprising aluminium or an aluminium alloy and SiC whiskers.

27. A metal matrix composite comprising aluminium or an aluminium alloy and substantially homogenously distributed therein SiC whiskers which are substantially uniformly coated with a layer of aluminium oxide having a thickness of 5–100 nm.

28. A method according to claim 19 wherein the compacted metal matrix composite is shaped by remelting into a final net or near-net shape, the coating around the fibres and or particles being a protective coating which under the remelting process reduces reactivity of the fibres and/or particles towards the metal or alloy of the matrix.

29. A method according to claim 19 wherein the metal matrix comprises aluminum or an aluminum alloy and the reinforcing fibres and/or particles comprise SiC whiskers.

30. A method according to claim 21 wherein the metal matrix comprises aluminum or an aluminum alloy and the reinforcing fibres and/or particles comprise SiC whiskers.

31. A method according to claim 22 wherein the metal matrix comprises aluminum or an aluminum alloy and the reinforcing fibres and/or particles comprise SiC whiskers.

32. A metal matrix composite produced according to the method of claim 19.

33. A metal matrix composite produced according to the method of claim 21.

34. A metal matrix composite produced according to the method of claim 22.

35. A method according to claim 7 wherein the inorganic colloid-forming powder is added to a concentration of 1–4% by weight.

* * * * *

UNITED STATES PATENT AND TRADEMARK OFFICE
CERTIFICATE OF CORRECTION

PATENT NO. : 5,506,061
DATED : April 9, 1996
INVENTOR(S) : Bruno Kindl, et al.

It is certified that error appears in the above-indentified patent and that said Letters Patent is hereby corrected as shown below:

Column 3, line 14, insert --:-- after "comprising"; line 51, "1" should be --one--; and in line 56, "and or" should be --and/or--.

Column 4, line 4, insert --:-- after "comprising"; and line 65, "ora" should be --or a--.

Column 5, line 57, delete "." after "added".

Column 7, line 29, insert --to-- after "interest"; and in line 51, insert --be-- after "may"

Column 8, line 43, "1879" should be --1979--.

Column 9, line 32, insert --to-- after "according".

Column 11, lines 2 and 32, "aluminum" should be --aluminium--.

Column 12, line 6, "0.51µm" should be --0.5µm--.

Column 14, lines 43-44, delete "." after "compared".

Column 16 (claim 1), line 16, insert --:-- after "comprising".

Column 17 (claim 20), line 36, "and or" should be --and/or--.

UNITED STATES PATENT AND TRADEMARK OFFICE
CERTIFICATE OF CORRECTION

PATENT NO. : 5,506,061

DATED : April 9, 1996

INVENTOR(S) : Bruno Kindl, et al.

It is certified that error appears in the above-indentified patent and that said Letters Patent is hereby corrected as shown below:

```
    Column 17 (claim 22), line 49, insert --:-- after
"comprising".

Column 17 (claim 21), line 41, delete "any one of" before the
word "claim".

Column 18 (claim 25), line 16, "21" should be --18--.

Column 18 (claim 27), line 22, "homogenously" should be
--homogeneously--.

Column 18 (claim 28), line 29, "and or" should be --and/or--.
```

Signed and Sealed this

Eighth Day of October, 1996

Attest:

BRUCE LEHMAN

Attesting Officer

Commissioner of Patents and Trademarks